Patented Feb. 9, 1932

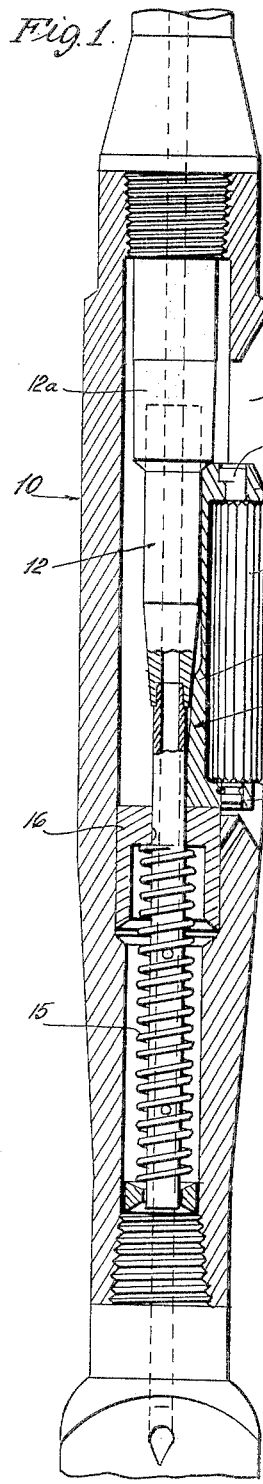
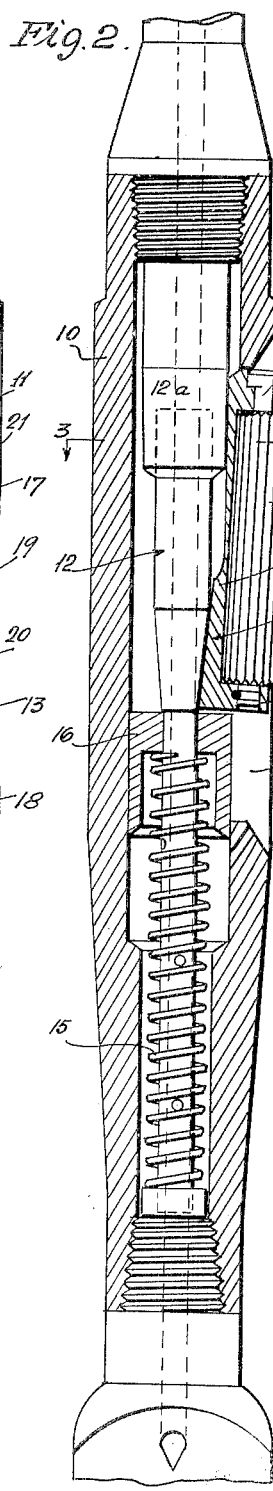
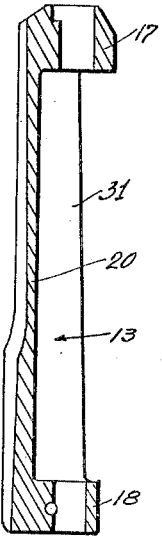
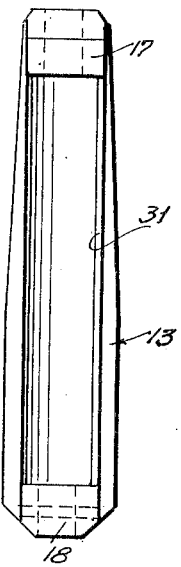
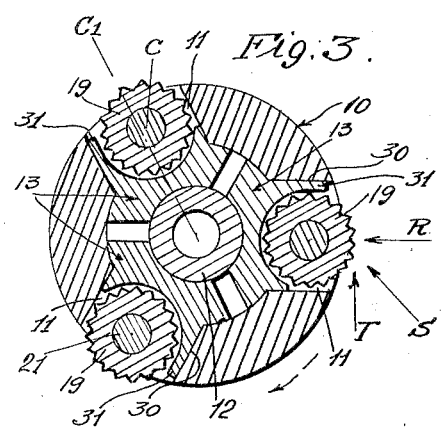
Feb. 9, 1932.     J. GRANT     1,844,357
ROTARY UNDERREAMER AND CUTTER ELEMENT THEREFOR
Filed Jan. 22, 1930
Inventor
John Grant.
Attorney.

1,844,357

UNITED STATES PATENT OFFICE

JOHN GRANT, OF LOS ANGELES, CALIFORNIA

ROTARY UNDERREAMER AND CUTTER ELEMENT THEREFOR

Application filed January 22, 1930. Serial No. 422,583.

This invention has relation to rotary reamers and has to do more particularly with improvements in cutter mountings for such reamers to enable the parts better to withstand the large pressures and stresses to which they are subjected.

The improvements in cutter mountings set out herein are generally applicable to any type of reamer wherein a cutter element or cutter carrier is mounted in a body slot and bears laterally against a side wall of the slot for support against imposed stresses. The invention, as will be readily understood from what follows, is not necessarily limited to any particular type of reamer or underreamer; but, because the practical use of the present improvement is to be found most largely in underreamers, I explain the invention in connection with a particular type of underreamer. Again it will be understood that the invention is not limited to its applicability to the details of that particular type. For instance it will be easily understood from the following description that the invention has applicability wherever the cutter element or cutter carrier is mounted in a body slot, or is so mounted in or on a body that it bears laterally against a body wall. Thus it is immaterial whether the cutter carrier moves in, or is stationary with relation to, the body slot.

Bearing these things in mind I shall proceed to a description of the invention specifically as applied to the type of underreamer which is set out in the Phipps Patent No. 1,678,073, dated July 24, 1928, and also set out in my application Serial No. 254,266, filed February 14, 1928. In that type of reamer there is a tubular body having longitudinally extending slots through a tubular wall. An internal mandrel is utilized to cause expansion and contraction of the cutters as they move vertically on the mandrel; and the cutter carriers are mounted in the body slots to be vertically movable therein and to project outwardly through the body slots when expanded.

In that type of reamer, as in any reamer wherein cutter carriers are mounted in body slots or the equivalent, the cutters are subjected to very large pressures which are not directly radial of the tool but which have a heavy circumferential component. That component stress is at times so heavy, and presses the cutter carrier against the side wall of the slot with such great force, as to deform either the cutter carrier or the bearing face of the slot wall, or both.

It is a common practice to use roller cutters as the ultimate cutting elements of such tools; and the cutter carriers have been formed with a head or bearing block at the upper end, and another head or bearing block at the lower end, and with a recess between the two heads for receiving the roller cutter. In that particular design it has usually been the case that the upper and lower heads of the cutter carrier have been substantially the only parts of the carrier which project out through the body slot and which therefore afford a bearing for the carrier upon the slot wall. The effective bearing faces being thus of limited extent, large imposed forces have caused excessive wear and at times have actually deformed the bearing surface of the slot wall by forcing the heads of the cutter carrier into that slot wall.

The present invention overcomes these difficulties by providing, on what will be termed the back side of the carrier, a bearing web which makes the bearing of the carrier on the slot wall substantially commensurate with the length of the carrier itself. The particulars and details of how this is done will be now described as a typical and illustrative embodiment of, but not of necessary limitation upon, the invention. For this purpose reference is had to the accompanying drawings in which Figure 1 is a longitudinal section showing the present invention applied to the particular type of underreamer aforesaid.

Fig. 2 is a similar section showing the parts in expanded position, whereas Figure 1 shows them contracted;

Fig. 3 is an enlarged cross section on line 3—3 of Fig. 2;

Fig. 4 is a detail longitudinal section of the cutter carrier, and

Fig. 5 is a front elevation of the cutter carrier.

The particular expansive underreamer illustrated in the accompanying drawings has a tubular body 10 with wall slots 11, said slots extending through the wall and being elongated vertically, or longitudinally of the body axis. Within the body is located an internal mandrel 12 which acts as a cutter expanding mandrel and as a cutter supporting abutment. The cutter carriers 13 lie in the body slots and have inner faces contacting with the mandrel; and the mandrel is so shaped (in this case having an upper relatively large part 12a) that upward movement of the cutter carriers from the position of Figure 1 to the position of Figure 2 causes outward expansive movement of the carriers. This upward movement is caused by a spring 15 which pushes upwardly on a cutter propeller 16. All this will be readily understood from an inspection of the drawings.

The cutter carriers as usually used in this particular type of underreamer have embodied a vertically extending part 20 with upper and lower heads 17 and 18, which heads project outwardly through the body slots 11. Mounted between the heads is the roller cutter 19, rotating on a vertical axis pin 21 mounted in the heads. In order to accommodate the roller cutter, the portion of the cutter carrier between the two heads must be recessed. A cutter carrier of the general type herein described may be looked upon as being a cutter block or cutter bar which has been recessed or notched back from its outer face to provide a recess for accommodation of the roller cutter. And such recessing for the roller cutter has, in past practice, left substantially only the heads 17 and 18, or their equivalents, projecting out through the slots, or projecting substantially into the slots; and has thus left only the limited side surfaces on those heads to bear against the side wall of the slot. Or in fact, such a cutter carrier may be considered as comprising two spaced heads between which the roller cutter is mounted. The vertical web 20 interconnects the spaced heads; but it has little or no function of bearing laterally on the slot wall.

In Figure 3 the usual right handed direction of rotation of the underreamer is illustrated by the large arrow. During operation, the stresses imposed upon each cutter are a radial inward pressure indicated by the arrow R and a more or less tangential pressure indicated by the arrow T, resulting in a resultant pressure or stress indicated by the arrow S. This resultant stress tends to press the cutter and cutter carrier back against what will be termed the rear wall surface 30 of the slot; and the pressures against that rear wall surface are sometimes exceedingly heavy, resulting in that excessive wear or deformation which I have noted.

In my improved design I provide, at the rear side of the cutter carrier, a web 31 extending vertically between the heads 17 and 18 and extending outwardly far enough to cover a substantial proportion of the slot wall surface and far enough out to be directly behind the roller cutter 19, in the direction of thrust imposed upon it. The specific illustrations show the bearing web of such horizontal width as to engage substantially the complete rear wall surface of the slot. Such extent may not in all cases be necessary but it is structurally just as easy to make the web of that horizontal width, as to make it of lesser width, and the full possible bearing area is utilized. Whatever the web widths may be, the bearing area of the carrier upon the slot wall is thus greatly increased and the pressures distributed, so that the pressure per unit area is much decreased, and the surfaces can take and support the heavy stresses without undue wear or deformation.

The bearing web, such as I have described, is necessary only on what I term the rear side of the carrier. Consequently, in order to make room within the body slot for this bearing web, of reasonable thickness, and at the same time not to increase the width of the body slot more than is necessary, and thus to maintain unimpaired the strength of the body; I offset center C of the roller cutter from the center of the carrier toward the forward side of the carrier. This is illustrated well in Figure 3 where the line C1 represents a radial plane through the center of a carrier, and the offsetting of the cutter center C forwardly from this radial line is apparent. The body slot is, in this case, centered on the radial plane which is parallel with its side walls. However, it will be seen that the same general ends may be reached by centering the cutter center on the radial plane and slightly unbalancing the slot width as regards that radial plane; in either case the roller cutter center is slightly offset forwardly with relation to the slot center.

I claim:

In a rotary reamer which comprises a body with a longitudinally extending wall slot, a cutter carrier in the body slot and extending longitudinally thereof, said carrier having a head at each end which heads project outwardly through the body slot, a roller cutter mounted between the carrier heads, a longitudinally extending bearing web extending between the heads at one side only of the roller cutter, the center of the roller cutter being laterally offset from the center of the carrier and of the slot toward the side of the carrier opposite the bearing web whereby to maintain unimpaired the strength of the body so that the reamer can take and support heavy stresses without undue wear or deformation.

In witness that I claim the foregoing I have hereunto subscribed my name this 14 day of January 1930.

JOHN GRANT.